United States Patent [19]

Wixom

[11] Patent Number: 4,991,150
[45] Date of Patent: Feb. 5, 1991

[54] ELECTROLUMINESCENT OPTICAL FIBER SHOCK SENSOR

[76] Inventor: Michael R. Wixom, 421 S. Seventh St., Apt. #1, Ann Arbor, Mich. 48103

[21] Appl. No.: 392,052
[22] Filed: Aug. 10, 1989
[51] Int. Cl.$^5$ ............................................. H04R 17/00
[52] U.S. Cl. .................................. 367/140; 367/157; 310/340; 381/172
[58] Field of Search .................. 367/140, 149, 157; 381/172; 310/340

[56] References Cited

U.S. PATENT DOCUMENTS

| | | | |
|---|---|---|---|
| 2,486,146 | 10/1949 | Frondel | 177/386 |
| 2,816,236 | 12/1957 | Rosen | 310/311 |
| 3,200,369 | 8/1965 | Neubauer | 340/10 |
| 3,202,868 | 8/1965 | Blank | 315/55 |
| 3,243,648 | 3/1966 | Yando | 315/55 |
| 3,273,447 | 9/1966 | Frank | 88/1 |
| 3,339,104 | 8/1967 | Kushner et al. | 310/339 |
| 3,886,489 | 5/1975 | Jones . | |
| 3,931,514 | 1/1976 | Patterson | 310/339 |
| 4,283,114 | 8/1981 | Wandrack | 350/96.20 |
| 4,492,121 | 1/1985 | Lehto | 73/705 |
| 4,546,458 | 10/1985 | Cielo et al. | 367/149 |
| 4,581,530 | 4/1986 | Brogardh | 250/231 R |
| 4,611,600 | 9/1986 | Cohen | 128/667 |
| 4,649,528 | 3/1987 | Benjamin | 367/149 |
| 4,748,366 | 5/1988 | Taylor | 310/311 |
| 4,877,988 | 10/1989 | McGinniss et al. | 310/357 |

OTHER PUBLICATIONS

W. J. Halpin; Current from a Shock-Loaded ... Journal of Applied Physics, vol. 37, #1; p. 153.
R. A. Graham et al.; Piezoelectric Current ... Journal of Applied Physics, vol. 36, #5, p. 1775.
R. A. Graham; Strain Dependence of Longitudinal ... Physical Review B; vol. 6, #12; p. 4779.

Primary Examiner—Charles T. Jordan
Assistant Examiner—J. Woodrow Eldred
Attorney, Agent, or Firm—James M. Deimen

[57] ABSTRACT

A piezoelectric or ferroelectric stress sensing material in intimate electrical communication with an electroluminescent material produces light at an amplitude dependent on the stress applied to the stress sensing material. The light signal is transmitted from the electroluminescent material by fiber optic cable to an optical signal detector. In the preferred embodiments the electroluminescent material comprises a light emitting diode as a small electrical short circuit load across two otherwise insulated faces of a piezoelectric or ferroelectric element. The embodiments include a composite stress sensing and electroluminescent material, separate stress sensing and electroluminescent materials joined by conductive film, foil or wire and additional means to bias, amplify and control the optical signal produced by the electroluminescent material and transmitted by the fiber optic cable.

31 Claims, 12 Drawing Sheets

ELECTROLUMINESCENT OPTICAL FIBER SHOCK SENSOR

BACKGROUND OF INVENTION

The field of the invention is the measurement of dynamic mechanical stress. More particularly, the invention relates to electric and fiber optic systems including stress sensitive transducer elements or combinations of elements which produce a stress dependent electrical or optical signal. In addition to measuring dynamic stress, such systems may be used to measure related variables such as acceleration, vibration, force, strain, stress wave arrival time, and stress wave velocity.

There are many devices currently available for obtaining measurements of dynamic stress. Most of these devices are based on materials which are capable of converting mechanical energy into electrical energy. The mechanical energy represents the elastic energy of compression in response to the applied stress which is to be measured. The electrical energy is then used to produce a stress dependent signal which is processed and transmitted to electronic recording devices.

Two classes of materials are useful for transducing mechanical energy or stress into electrical signals. Once class is the piezoelectric materials which are crystalline substances that develop an electrical polarization proportional to the applied stress. The second class consists of ferroelectric materials which are crystalline substances that can attain a spontaneous and reversible metastable electrical polarization. The electrical response of a ferroelectric substance derives from the stress dependent depolarization of a prepolarized crystal. The electrical response of piezoelectric materials arises from the stress dependent polarization of a nonpolarized crystal.

The response of either class is referred to as the "piezoelectric" response or the "piezoelectric" effect by those who are experienced in the art. Since either type of response is useful in stress transducers, including the present invention, "piezoelectric" effect or response will hereafter refer to the response of either piezoelectric or ferroelectric materials. Furthermore, any reference to "piezoelectric" components will refer to components based on either piezoelectric or ferroelectric materials.

The stress induced changes in electrical polarization produce a change in the electrical potential between at least two opposing faces of properly oriented piezoelectric or polarized ferroelectric crystals. Under conditions in which the two crystal faces are electrically insulated from each other (the open circuit mode), the applied stress can be determined by directly measuring the change in the electrical potential. Under conditions in which the two crystal faces are connected through a small electrical load (the short circuit mode), the applied stress can be determined from the current through the load.

The present invention employs piezoelectric materials in the short circuit mode. For piezoelectric materials the relationship between the electrical polarization and the applied stress can be expressed as:

$$P_i = \sum_{j=1}^{6} d_{ij}\sigma_j \quad (1)$$

where $P_i$ are the three components of the polarization vector, $\sigma_j$ are the six components of the stress tensor, and $d_{ij}$ are the eighteen piezoelectric coefficients relating the i'th and the j'th directions.

A mathematical model for the response of piezoelectric and ferroelectric materials is derived in the Journal of Applied Physics 37(1), 153, (1966) showing the relationship of the electrical current i to the stress induced changes in polarization P:

$$i(\sigma,t) = -\frac{dD}{dt} = \frac{A(\epsilon E_c/P(\sigma))(ct/l)^{n-1}}{\{(ct/l)^n + (\epsilon E_c/P(\sigma))^n[1-(ct/l)^n\}^{(n+1)/n}} \quad (2)$$

where A is the electroded area and l is the thickness of the material. Time t is measured from the moment of incidence of a stress wave which propagates through the material with a velocity c. The remaining parameters $E_c$, P, D, and $\beta$ reflect the polarization characteristics of ferroelectric materials:

$$(D/P_0)^n + (E/E_c)^n = 1$$

where D is the electric displacement, $E_c$ is a positive reference field magnitude, $P_o$ is the initial remanent polarization, and $\eta$ is a constant the fixes the polarization nonlinearity. Piezoelectric materials represent the case where $(\eta E_c/P)=1$ and $\eta=1$. The numerous assumptions and details of this model are discussed in the above reference.

Piezoelectric and ferroelectric stress transducers are typically operated so that the stressed region is in a state of one dimensional strain, and the electric fields produced are along the same dimension as the strain. Such a one dimensional response is experimentally attainable by using specially oriented crystals, e.g. x-out quartz, so that the applied stress is aligned with a high symmetry axis of the crystal. For the one dimensional case equation 1 simplifies to:

$$P(x) = d\sigma(x)$$

The one dimensional response of piezoelectric crystals then simplifies to:

$$i(t) = \frac{Acd}{l}(\sigma_c - \sigma_l) \quad (5)$$

Here, $\sigma_0$ is the one dimensional stress normal to the front surface electrode, and $\sigma_l$ is the stress at the rear electrode. Equation 5 shows that for time less than the stress wave transit time through the crystal ($\sigma_l=0$), piezoelectric materials behave as a constant current source from which the current is a linear function of the applied stress. Such optimally oriented piezoelectric crystals are therefore a simple and convenient stress transducer.

Quartz and lithium niobate are examples of piezoelectric materials whose responses are well modelled by equation 5. Quartz has a piezoelectric coefficient of $2.1*10^{-8}$ C/cm$^2$kbar and produces a short circuit current output of 0.40 A/cm$^2$ under an applied stress of 10 kbar over a duration of 0.5 microsecond. This duration corresponds to the stress wave transit time through a 3 mm thick quartz crystal. Lithium niobate has a greater piezoelectric coefficient and produces 1.20 A/cm$^2$ under a similar 10 kbar stress. FIG. 1 shows a plot of the electrical polarization P for quartz and lithium niobate as a function of pressure.

Quartz has long been a preferred material for stress transducers. Its excellent stability and reproducibility have established quartz as the piezoelectric material of choice despite the availability of many other materials with higher responsivities. Numerous reports in the literature discuss the piezoelectric response of quartz (see for example: J. Appl. Phys. 36(5), 1775 (1965) and Phys. Rev. B 6(12), 4779 (1972). Quartz based stress transducers are commercially available from a number of suppliers.

Ferroelectric materials can have much higher piezoelectric responses and offer the potential of much greater sensitivity in stress transducers. The high responsivity results from the ability of ferroelectric materials to be polarized to remanent polarizations which are much higher than those produced in stressed piezoelectric materials. Consequently, the stress induced depolarization of ferroelectric materials can produce much higher currents than are produced by the stress induced polarization of piezoelectric crystals. For example, the remanent polarizations for three well known ferroelectric materials are given in table 1 below. These values are two to three orders of magnitude higher than the piezoelectric coefficient of quartz. Accordingly, much higher current outputs have been reported for these materials: a 10 kbar stress wave produces 1 A/cm$^2$ from PVF2 or nearly 300 A/cm$^2$ from PZT 95/5 compared to 0.40 A/cm$^2$ from quartz.

TABLE 1

| | P $\mu C/cm^2$ |
|---|---|
| Barium titanate | 26 |
| Lead zirconium titanate | 36 |
| Polyvinylidene difluoride (PVF2) | 13 |

The drawback to using ferroelectric materials in stress transducers is that the current response is neither constant over time nor linearly dependent on stress. FIG. 2 compares the current outputs of stressed piezoelectric and ferroelectric materials as functions of time. FIG. 2 shows the response given by equation 2 where the output currents have been normalized to the total integrated current (charge). In general, the nonnormalized current response of ferroelectric materials would be much larger than that of piezoelectric materials. FIG. 3 shows the relative depolarization of PVF2 and PZT 95/5 as functions of stress. Ferroelectric materials can serve as useful stress transducers over the range in which the depolarization is a well behaved function of stress. Within this range either the peak current or time integrated current can serve as useful measurements of stress, especially when referenced to a calibrated response curve for the transducer. Commercial ferroelectric based stress transducers are available from a number of sources.

Stress transducers based on the piezoelectric response are generally restricted in applicability by limitations which enter in the processing and transmission of small electrical signals. Successful detection of such signals is limited by the loss in signal strength and the increase in noise which may occur during transmission. The signal to noise ratio is especially noteworthy since transient stress measurements must frequently be made in electronically noisy environments. Examples of such environments include explosive detonations, ballistics experiments, shock waves, combustion, chemical reactors, and heavy industrial machinery.

Some stress transducer designs address the problem of low signal to noise ratio by incorporating an integrated circuit preamplifier in the sensor to condition and amplify the signal for transmission over coaxial cable. The preamplifier complicates the assembly of the sensor. The preamplifier also requires an external power source. In applications requiring signal transmission over distances greater than hundreds of meters, the costs of the cable and repeater amplifiers can become substantial.

To avoid the limitations of electronic signal transmission, several existing and proposed stress transducers produce optical signals that can be transmitted using fiber optic technology. Fiber optic transmission lines are generally less expensive and less susceptible to noise than are the coaxial cables used for electronic signals. U.S. Pat. No. 4,492,121 discloses a method and apparatus for measuring high transient isotropic pressures. The apparatus consists of a fiber optic waveguide having at one end a crystal that fluoresces with a wavelength that varies in response to pressure. U.S. Pat. No. 4,649,528 describes an apparatus for measuring the arrival time and velocity of shockwaves. The apparatus consists of gas filled microballoons mounted on optical fibers. Incident shock waves rapidly compress and heat the gas to produce a short pulse of light. In U.S. Pat. No. 4,581,530 a fiber optic pressure sensor is described in which the pressure is measured by interferometrically observing the deformation of a diaphragm at the end of the fiber.

SUMMARY OF THE INVENTION

In the present invention the apparatus combines a Piezoelectric material with an electroluminescent material so as to produce an optical signal with a stress dependent amplitude. The piezoelectric material responds to the applied transient stress by developing a stress dependent electrical potential. This electrical potential is used to drive an electrical current through the electroluminescent material to produce an optical signal. Under certain circumstances, the piezoelectric material and the electroluminescent material may be identical. The apparatus may also include a small battery or photovoltaic voltage source to provide a bias potential near the band gap of the electroluminescent material. The electroluminescent material is coupled to an optical fiber waveguide to realize the advantages of optical fiber signal transmission.

Accordingly, an object of the present invention is to provide an apparatus for measuring the magnitude of transient stress or pressure.

Another object of the invention is to provide an apparatus for producing an optical signal having a stress dependent amplitude.

Another object of the invention is to provide an apparatus for measuring transient stress in the presence of significant electromagnetic interference.

Another object of the invention is to provide an apparatus which is more economical to produce and implement than presently available devices for measuring transient stress.

Another object of the invention is to provide an apparatus compatible with optical fiber technology and long distance signal transmission.

Another object of the present invention is to provide an apparatus to measure strain, force, vibration, acceleration or other parameters which can be related to transient stress or pressure applied to a stress transducer.

DETAILED DESCRIPTION OF PREFERRED EMBODIMENTS

Figure 4:
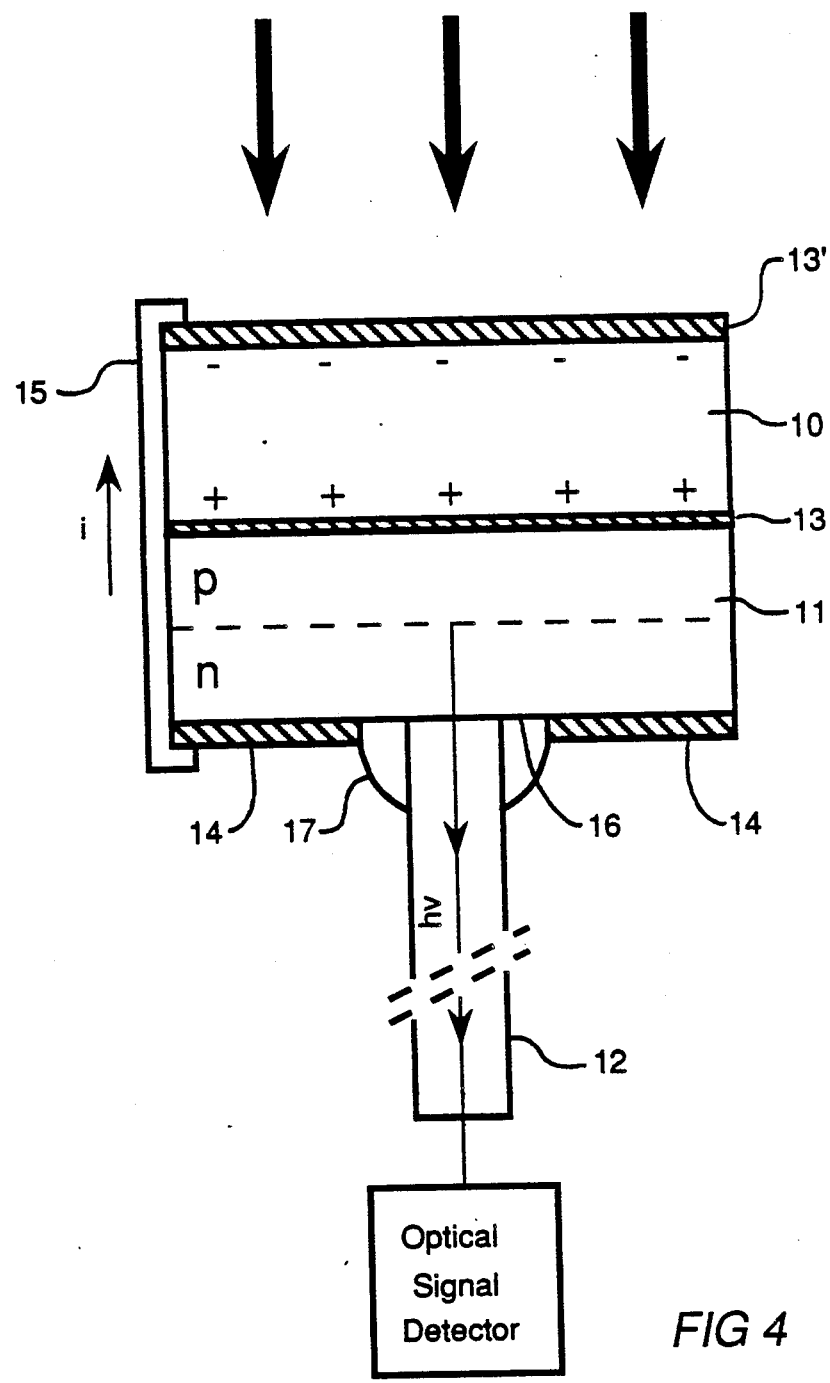
FIG. 4 is a schematic representation of the basic sensor design combining piezoelectric and electroluminescent components.

FIG. 4 illustrates one embodiment of the present invention which is comprised of a piezoelectric component (10) connected electrically to an electroluminescent component (11) which is in turn connected optically to a fiber optic signal transmission line (12). Thin film electrodes (13 and 13') are fabricated on two opposing faces of the piezoelectric component. The electroluminescent component is mounted in direct contact with one of the electroded faces (13) of the piezoelectric component. The second electrode (13') of the piezoelectric component is electrically connected to the remaining electrode (14) of the electroluminescent component by a conductive film, foil or wire (15). The optical fiber is bonded to the emitting face (16) of the electroluminescent component with epoxy (17).

The piezoelectric component can be fabricated from either piezoelectric or polarized ferroelectric materials. Suitable materials are available in a variety of forms including but not limited to specially cut single crystals (e.g., x-cut quartz), hot pressed polycrystalline wafers (e.g., PZT 95/5), and semicrystalline polymer films (e.g., PVF2). A presently preferred embodiment uses an x-cut quartz wafer. Another preferred embodiment uses poled PVF2 film. The piezoelectric component must be correctly oriented so that the applied stress induces a change in electrical potential between two crystal faces. These two faces must be provided with electrodes (13 and 13'). A presently preferred embodiment includes electrodes which are evaporated or sputtered over most of the area of the selected faces. Under ideal conditions the sensitivity of the transducer is linearly proportional to the area of the electrodes. Some electrode configurations produce nonlinear responses due to electrostatic edge effects. A preferred electrode configuration is the guard ring configuration which is known to eliminate nonlinear effects in quartz crystal piezoelectric transducers (see J. Appl. Phys 36(5), 1775 (1965)).

The electroluminescent component may be any material that produces light having an intensity that varies in response to the applied electric potential or current. In one preferred embodiment of the present invention this component is comprised of a light emitting diode. The output intensity of light emitting diodes is typically a nearly linear function of the forward current through the diode over several orders of magnitude. It is important that the diode be correctly oriented with respect to the piezoelectric component to ensure that the stress induced piezoelectric potential puts a forward bias on the diode, i.e. the face of the piezoelectric component which develops a positive potential should be connected electrically to the p doped side of the diode. The negative face should be connected to the n doped side of the diode.

In selecting a light emitting diode as the electroluminescent component, several performance features should be considered. The diode rise time should be fast relative to the desired temporal resolution of the stress measurement. The diode efficiency should be high to maximize the sensitivity of the transducer. Two presently preferred electroluminescent materials are doped gallium arsenide and gallium aluminum arsenide which are among the most efficient known light emitting diode materials. The rise time of the optical output is largely determined by the carrier diffusion length which is a function of the design and physical dimensions of the diode.

Figure 5:
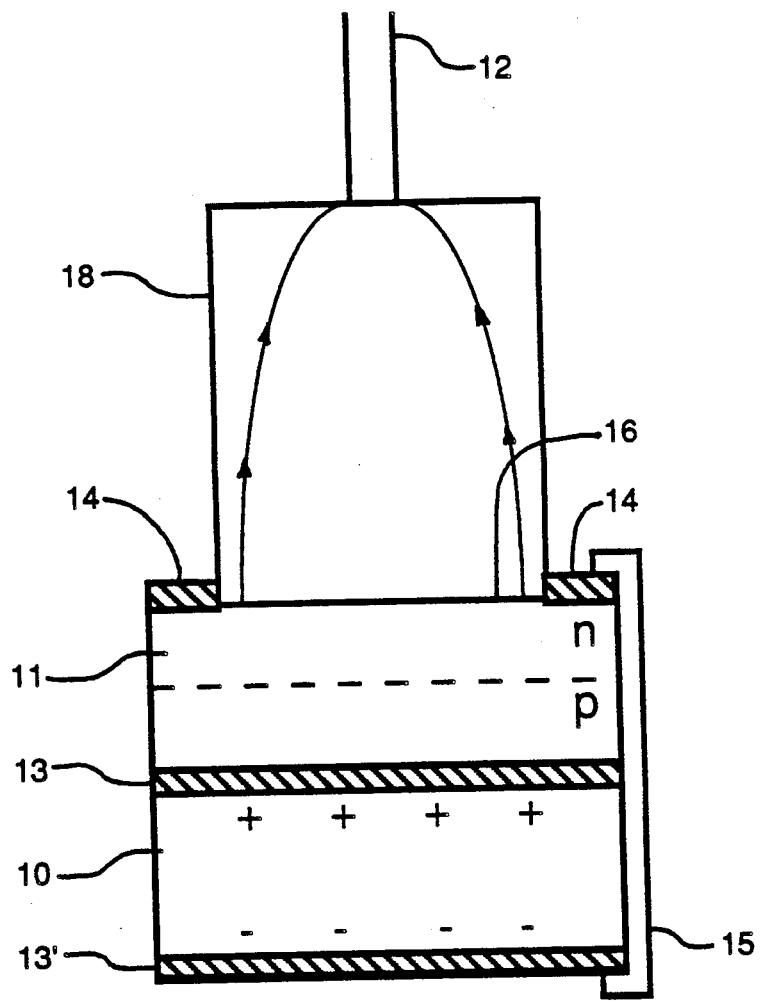
FIG. 5 illustrates one embodiment for improving the optical coupling efficiency between the optical fiber and the electroluminescent component.

In a second embodiment (FIG. 5) the light collection efficiency of the optical fiber is improved by placing a gradient index lens (18) between the fiber end and the emitting surface. The gradient index lens is chosen to have a field of view including most of the emitting surface (16) and a numerical aperture matching that of the optical fiber (12).

Figure 6:
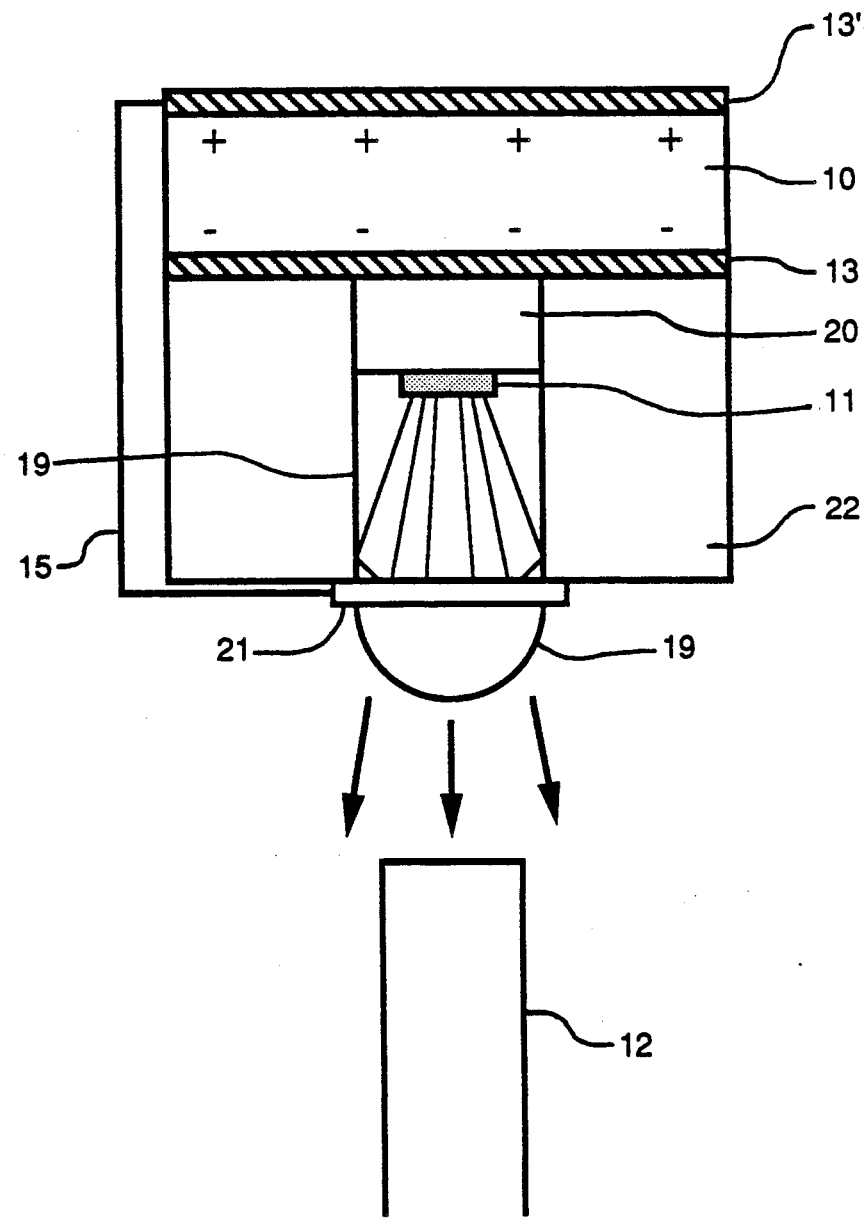
FIG. 6 illustrates an embodiment which uses a commercially Packaged light emitting diode as the electroluminescent component.

In a third embodiment of the present invention (FIG. 6), the electroluminescent component is a commercially packaged light emitting diode (11) which includes reflecting surfaces and collimating optics (19) designed to couple the diode output into an optical fiber. The commercially packaged diode is mounted so one electrode (20) is in direct contact with the appropriate electrode (13) of the piezoelectric component. The remaining electrode (21) of the packaged diode is electrically connected to the piezoelectric component by a conducting film, foil or wire (15). The diode package may be surrounded by a washer (22) to provide structural support. A gradient index lens may also be used in this embodiment to focus the collimated diode output beam onto the smaller optical fiber.

The optical output may be detected by any of several types of radiation transducers which measure the intensity of light. The most sensitive transducers for wavelengths shorter than about 1 μm are photomultiplier tubes and avalanche photodiodes. The least expensive transducers are photodiodes and phototransistors. Other radiation transducers include photographic film, photodiode arrays, and photothermal devices. The selected intensity measuring device should provide time resolution better than the desired resolution of the stress measurement. The output from the fiber optic transmission line is focussed onto the collecting surface of the detector. In some circumstances it may be desirable to optically isolate the signal from broadband optical background by placing an optical filter between the fiber and the detector. The filter may be, for example, a narrow bandpass filter selected to transmit only at the emission wavelength of the electroluminescent component. It may also be desirable to temporally isolate the stress signal by the use of shutters or electronic gating techniques synchronized to the event that generates the stress.

Figure 7:
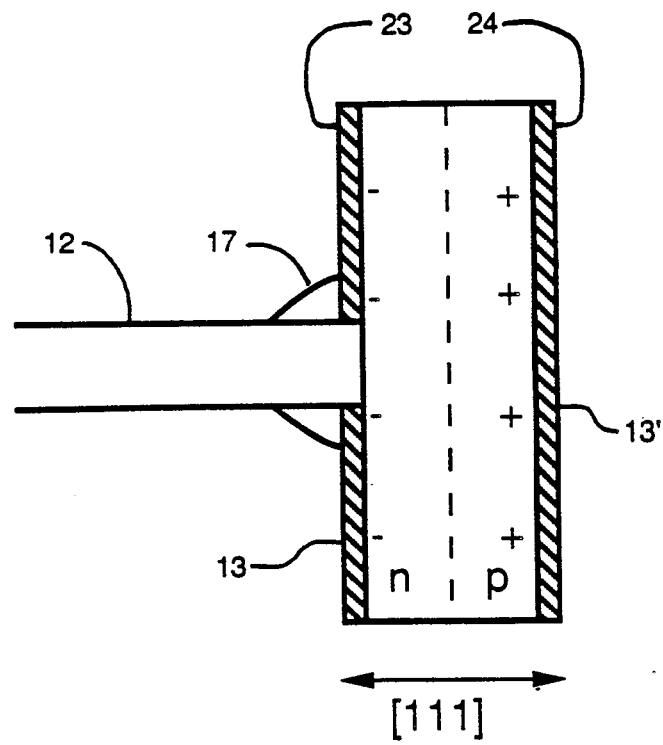
FIG. 7 is a schematic representation of the basic design in which the piezoelectric material and the electroluminescent material are identical.

FIG. 7 shows another preferred embodiment of the present invention. In this embodiment a single component provides both the piezoelectric and the electroluminescent response. Several examples of materials which may be both piezoelectric and electroluminescent exist among the class of compounds known as III-V or II-VI semiconductors. One example of such a material is gallium arsenide. A common configuration of light emitting diode uses a single crystal of gallium arsenide oriented so that the emitting crystal face (23) is a (111) crystal plane. One of the electrodes (13) is attached to the emitting crystal face. The second electrode (13') typically covers the entire opposite face of the crystal (24). The gallium arsenide crystal is doped to form a np junction diode between the two electrodes.

Gallium arsenide is a cubic crystal belonging to the F43m space group. Members of this space group have only one independent piezoelectric coefficient, $d_{14}$. For gallium arsenide $d_{14} = 2.7*10^{-12}$ m/V. Stressing a gallium arsenide crystal along the 111 direction, i.e. normal to the (111) emitting face, results in an electric polarization along the 111 direction. From tensor analysis and geometric considerations it follows that $$P_{[111]} = -\frac{2}{\sqrt{3}} d_{14} T_{[111]}$$

where P is the electrical polarization in C/m² and T is the stress in N/m². Since the piezoelectric and elastic constants of gallium arsenide are comparable to quartz, a comparable degree of electric polarization is expected in response to a given stress. If the electric potential between the two (111) faces exceeds the forward voltage drop of the diode, a forward current will produce charge recombination and optical emission. For this to occur, the gallium arsenide crystal must be oriented so that the p doped side becomes positively charged by the applied stress. Since the A crystal face (the face comprised of gallium atoms) becomes positively charged under positive stress, the A face must be on the p doped side of the junction. In this embodiment no external electrical connection is needed between the A crystal face (24) and the B crystal face (23). The optical connections and signal detection are the same as described for the previous embodiments. A stress transducer of this embodiment would be easier and more economical to assemble than those which are available in the prior art.

Figure 8:
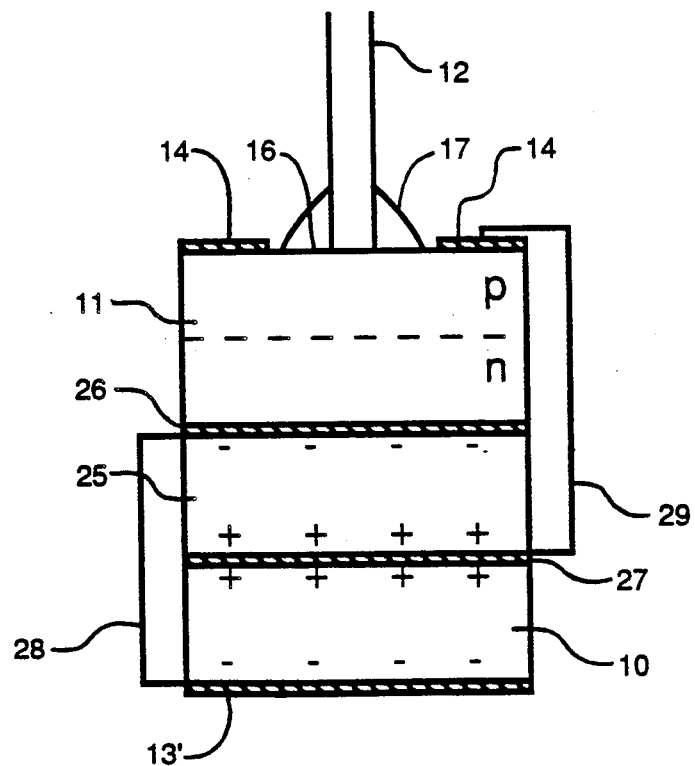
FIG. 8 is a schematic of a design which includes a battery voltage supply to bias the electroluminescent material and improve the sensor responsitivity at low stress.
Figure 9:
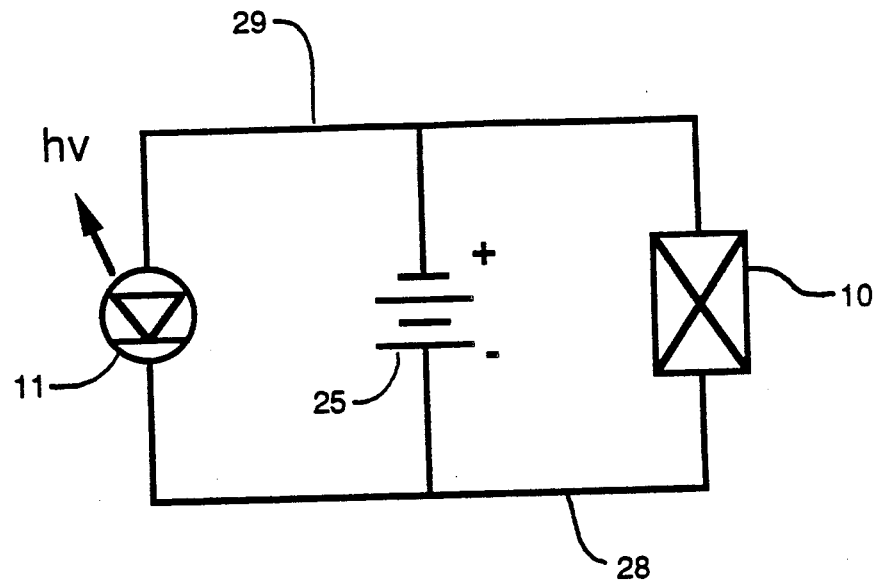
FIG. 9 is an electrical schematic for the design shown in FIG. 8.

Another embodiment of the present invention (FIG. 8) includes a battery voltage source (25) as one of the transducer components. The battery is electrically connected to be in parallel with the electroluminescent component (11) and the piezoelectric component (10). In the illustrated configuration the battery is inserted so that the battery anode (26) is directly connected to the n-doped side of a light emitting diode, and the battery cathode (27) is directly connected to the positively charging electrode of the piezoelectric component. The anode is also connected to the negatively charging electrode by a conducting foil, film or wire (28). Likewise, the cathode is also connected (29) to the p-doped side of the light emitting diode. An electrical schematic of this embodiment is shown in FIG. 9.

The battery function is to provide a voltage bias at or near the turn-on voltage of a light emitting diode serving as the electroluminescent component (11). The bias voltage improves the low stress sensitivity of the transducer by eliminating or reducing the potential that must be provided by the piezoelectric response in order to stimulate luminescence from the light emitting diode. In the case that the battery voltage exceeds the LED turn-on voltage, the LED emits continuously. The emitted intensity varies in response to the stress applied to the piezoelectric component. The transducer sensitivity is then limited by the ability of the detection apparatus to resolve the intensity variations rather than by the minimum stress needed to turn on the LED with the piezoelectric potential alone. In the case that the battery voltage is less than the LED turn-on voltage, the LED does not emit until the piezoelectric response added to the battery voltage exceeds the turn-on voltage of the LED. In this partially biased mode, the transducer sensitivity is better than the sensitivity in the unbiased mode, but is probably worse than in the continuously on mode. The partially biased mode does have an advantage over the continuously on mode in that the battery drain is much lower.

Figure 1:
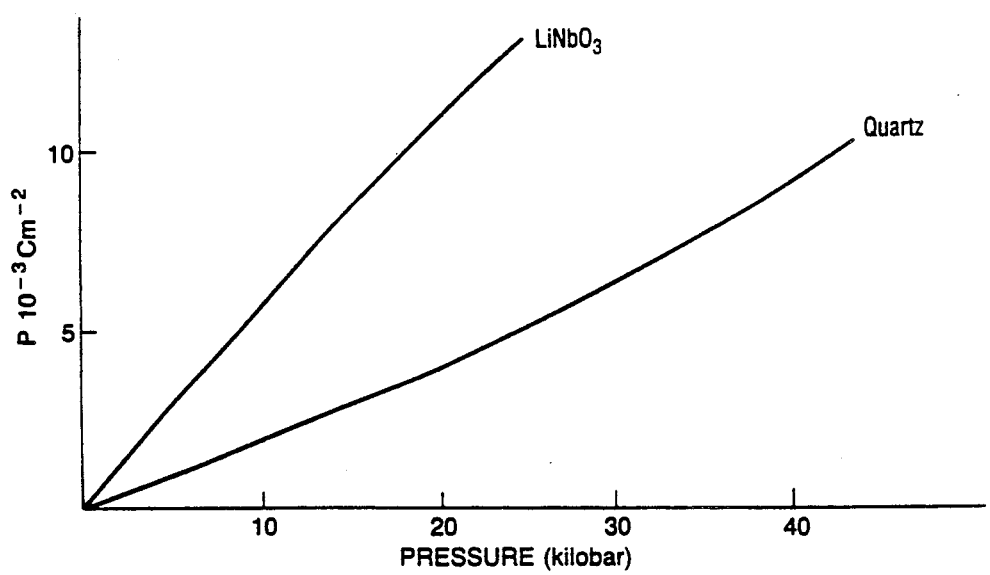
FIG. 1 is a plot of piezoelectric polarization versus pressure.
Figure 2:
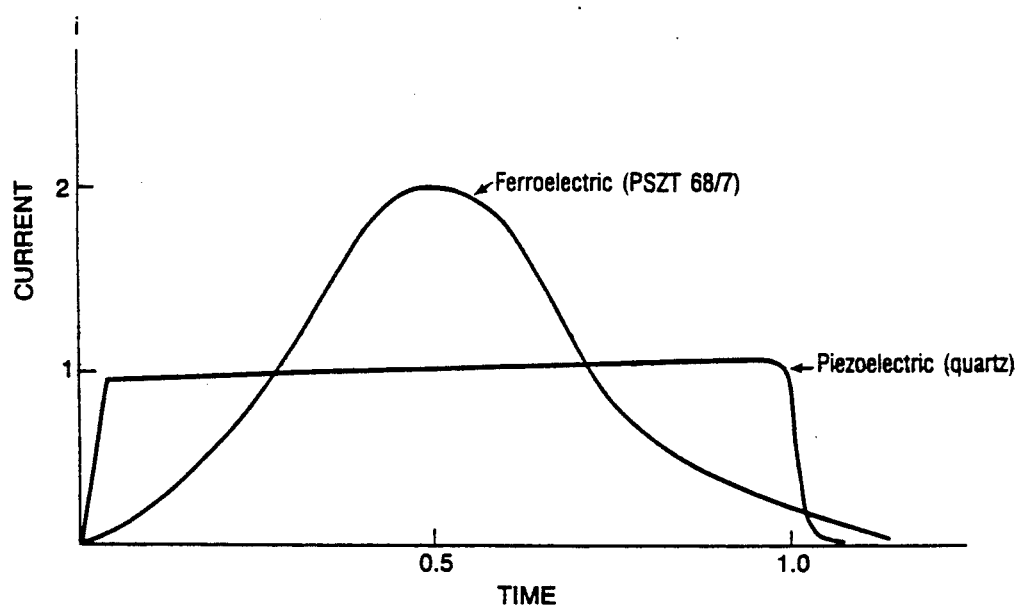
FIG. 2 is a plot of normalized short circuit electrical current versus time.
Figure 3:
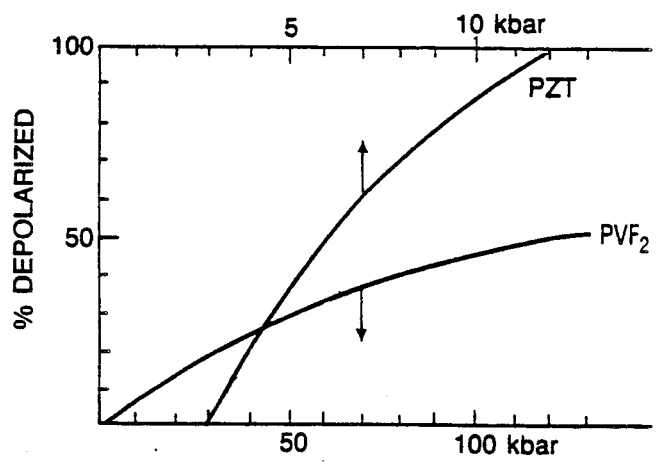
FIG. 3 is a plot of percentage depolarization versus stress.
Figure 12:
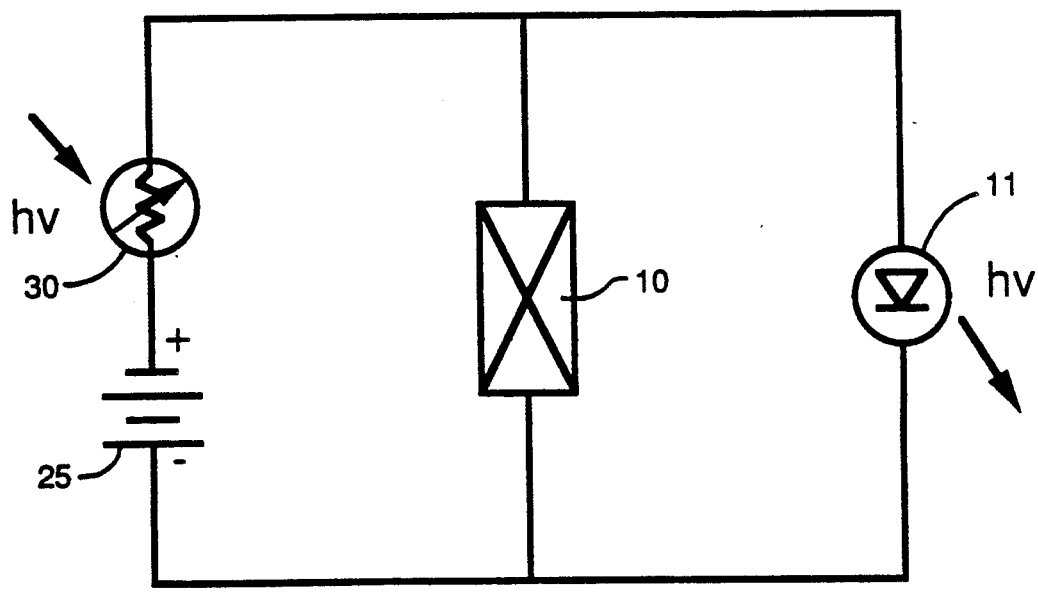
FIG. 12 is an electrical schematic of the embodiments shown in FIGS. 10 and 11.
Figure 10:
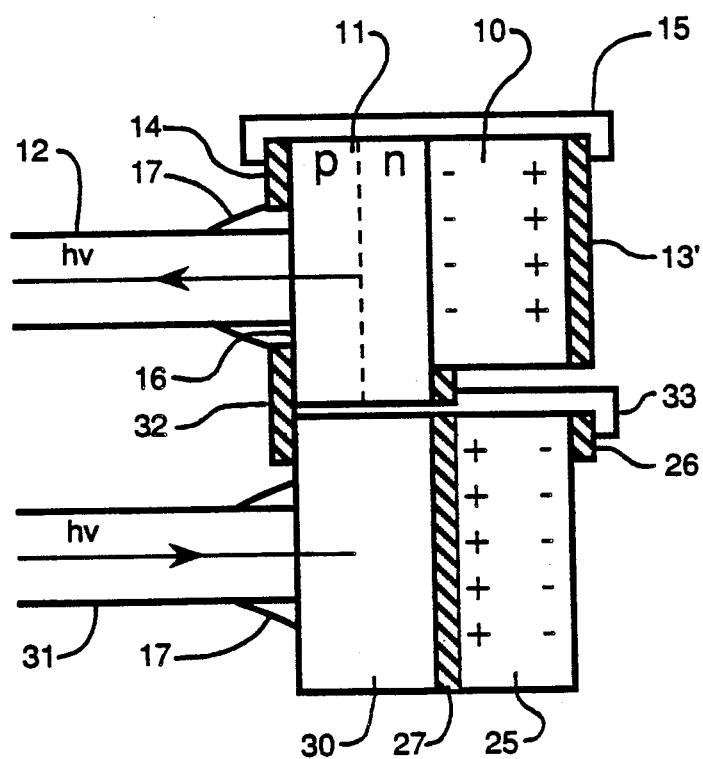
FIG. 10 is a schematic of a design which includes a photoconductive component and a battery in addition to the piezoelectric and electroluminescent components.
Figure 11:
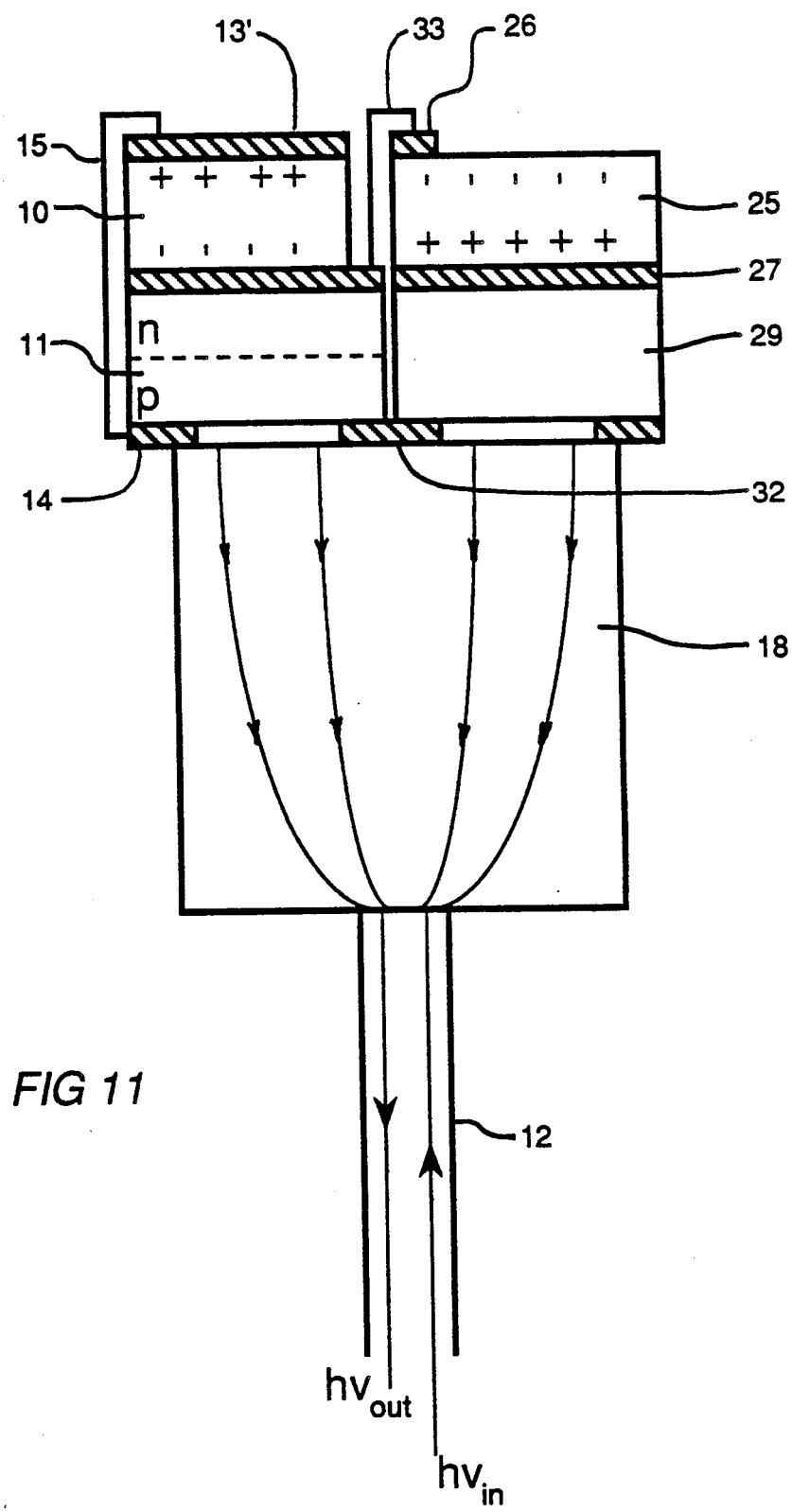
FIG. 11 illustrates an embodiment to improve the optical coupling efficiency to the electroluminescent and the photoconductive components.

Another embodiment of the present invention includes a battery voltage source and a photoconductive component in series with the battery and the electroluminescent component. FIG 10 shows one possible configuration of this embodiment. The photoconductive component (30) is connected to a second optical fiber (31) which transmits a signal controlling the resistance of the photoconductor. The photoconductor is in series between the battery and the parallel combination of the electroluminescent and piezoelectric components. The photoconductor is electrically connected to one side of the parallel combination through (32), while the battery is connected to the other side by (33). FIG. 11 shows a second configuration of this embodiment in which a gradient index lens (18) is used to eliminate the need for a separate optical fiber to carry the photoconductor signal. An electrical schematic for this embodiment is shown in FIG. 12.

The photoconductive component serves to modulate the bias voltage across the light emitting diode. Modulation may serve two useful functions. It may be useful as a switch to eliminate battery drain when transducer readings are not being made. Or, modulation may be used to create an optical carrier frequency which will be amplitude modulated by the transducer signal. Photoconductive devices may consist of junction devices such as photodiodes or phototransistors or of bulk photoconductive materials such as cadmium sulfide or cadmium selenide.

Figure 13:
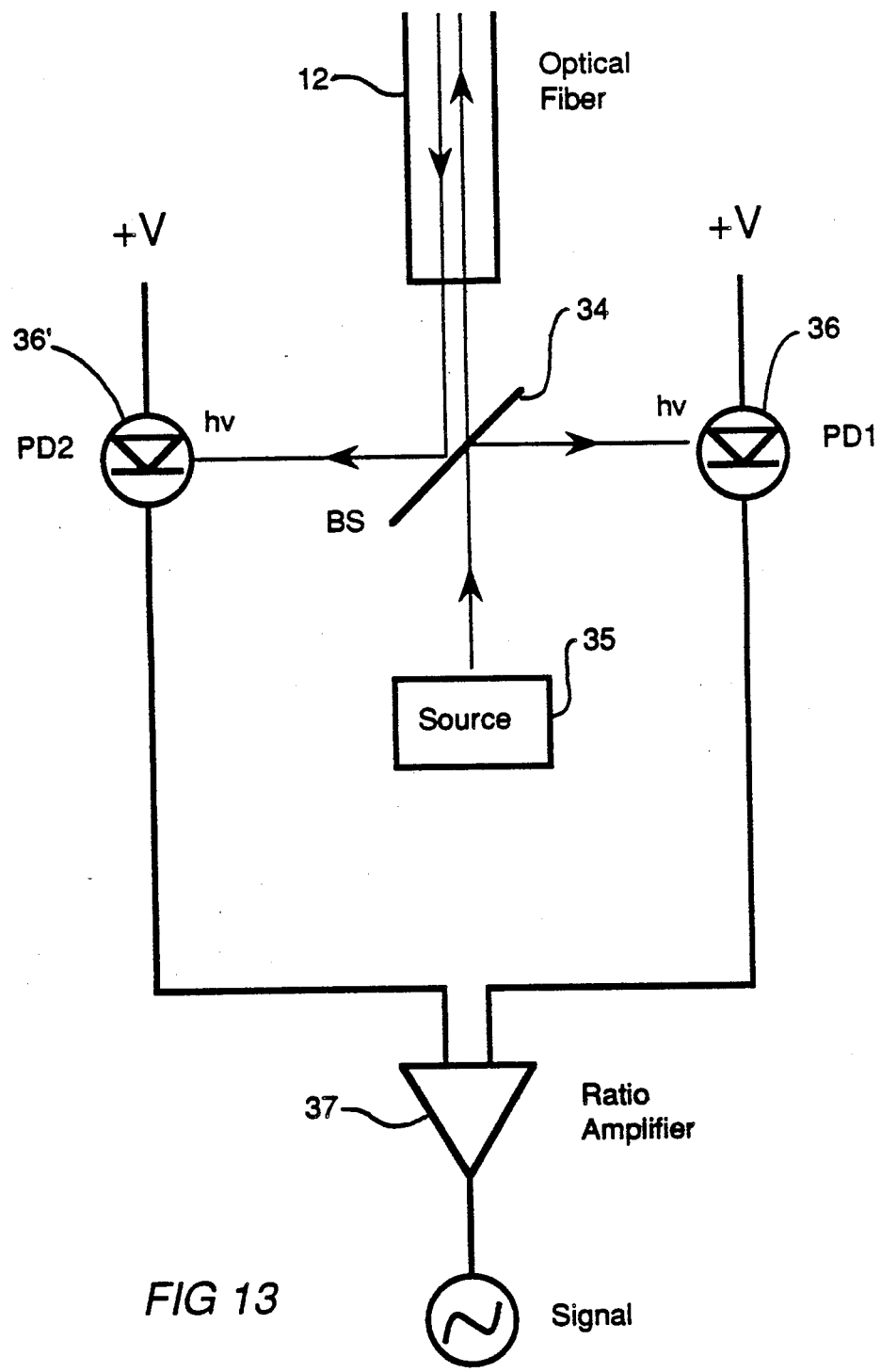
FIG. 13 illustrates an optical schematic to separate the transmitted signal from the reflected fraction of the optical signal used to control the photoconductive component.

The photoconductive component will require an input light source to modulate the bias voltage. This input light source may be delivered through a separate fiber (31) as shown in FIG. 10 or through the same fiber (12) used to transmit the output signal as shown in FIG. 11. In the latter case the output signal must be separated from the input light reflected from the photoconductor back down the fiber. One scheme for extracting the output signal is shown in FIG. 13. In this scheme the output signal is detected as the change in the ratio of the light intensity coming through the fiber to the light emitted by the input source. This scheme is useful if the photoconductor absorption band strongly overlaps the electroluminescent output band. A beam splitter (34) is positioned between the photoconductor signal source (35) and the optical fiber (12) to deflect part of the photoconductor signal toward a detector such as photodiode #1 (36). The beamsplitter also deflects a portion of the returning light to another detector such as photodiode #2 (36'). By measuring the ratio of the two signals (37) the electroluminescent signal can be separated from the photoconductor signal which is reflected back down the fiber.

Figure 14:
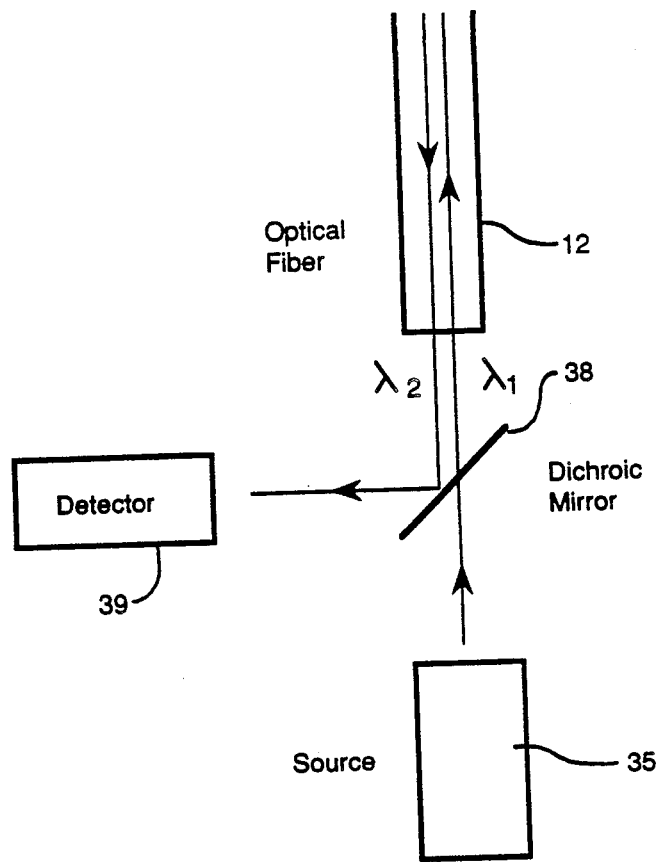
FIG. 14 illustrates another optical schematic to separate the transmitted signal from the reflected fraction of the optical signal used to control the photoconductive component.

A second scheme for isolating the output signal from the light input is shown in FIG. 14. If the electroluminescent output wavelength does not overlap the input wavelength, the output signal can be separated with a simple dichroic filter or mirror (38) which spatially separates the signal from the reflected light generated by the source (39) used to modulate the resistance of the photoconductor.

Figure 15:
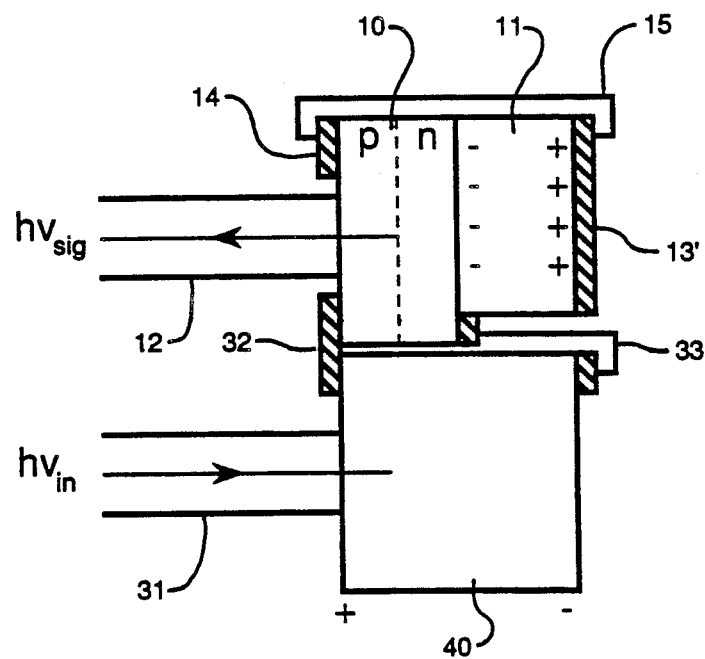
FIG. 15 is a schematic of a design which includes a photovoltaic component to bias the electroluminescent material and improve the sensor responsivity at low stress.
Figure 16:
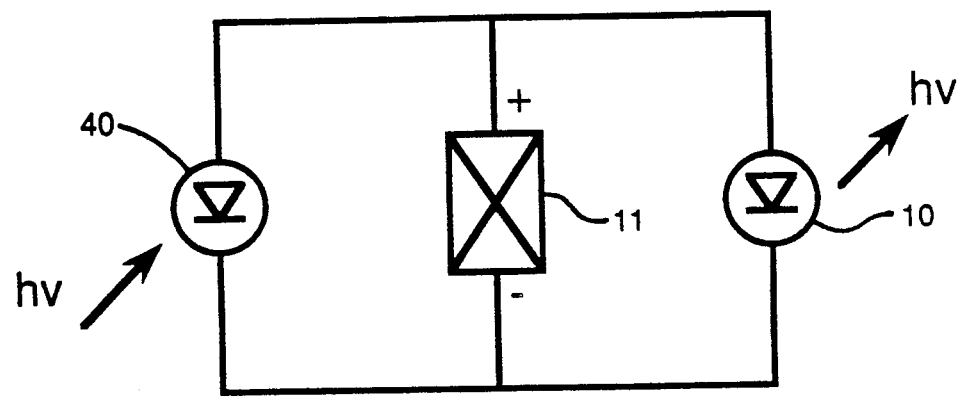
FIG. 16 is an electrical schematic for the embodiment shown in FIG. 15.

Another embodiment of the present invention includes a photovoltaic device in conjunction with piezoelectric and electroluminescent components. One such configuration is illustrated in FIG. 15. The photovoltaic device (40) replaces the battery or battery/photoconductor components in the previous embodiments (c.f. FIG. 10) and provides a bias voltage for the electroluminescent component. FIG 16 shows an electrical schematic of this embodiment.

The photovoltaic device converts a light input signal into a voltage output. This light input may be ambient light, light transmitted down a second fiber, or light transmitted down the same fiber used by the stress transducer signal. In the latter case, the signal may be isolated from the reflected photovoltaic input light by using the methods described for the previous embodiment. As also described for the previous embodiment, the photovoltaic input may serve as a simple on-off switch, or it may be used to provide a carrier frequency to be amplitude modulated by the transducer signal.

Figure 17:
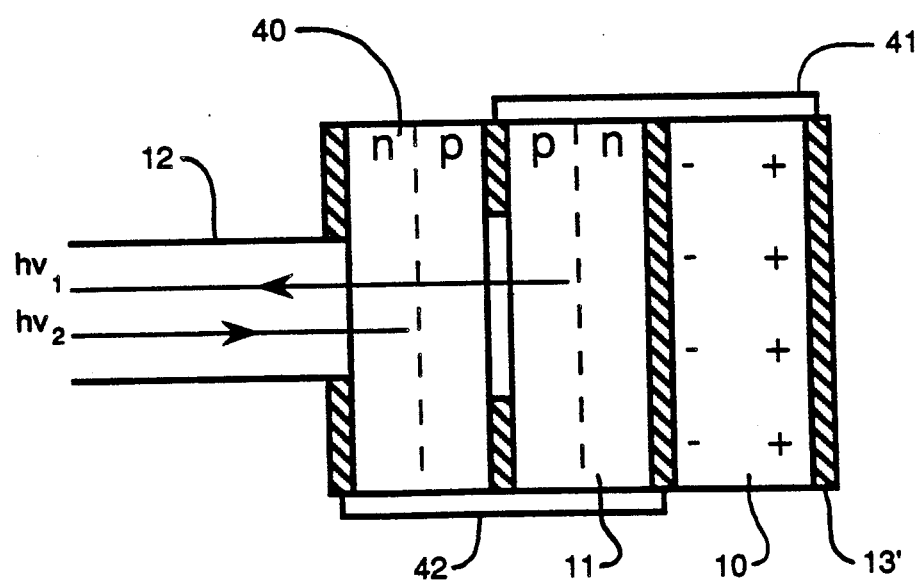
FIG. 17 is another schematic of a design which includes a photovoltaic component to bias the electroluminescent material and improve the sensor responsivity at low stress.

FIG. 17 shows another configuration of this embodiment in which the piezoelectric material (10), the electroluminescent emitter (11), and the photovoltaic device (40) are in a multilayered assembly. The assembly requires the electrical connections (41) and (42) in addition to those made by direct contact of electroded surfaces This assembly is possible if the photovoltaic absorption band does not overlap the electroluminescent emission band. For example, photovoltaic devices may be fabricated from silicon which absorbs from 400–1200 nm, but is transparent at wavelengths longer than 1200 nm. Electroluminescent devices emitting at wavelengths longer than 1200 nm can then be located behind the photovoltaic device and the output can be transmitted through the photovoltaic material into the optical fiber transmission line. Such a multilayer assembly may be simpler to implement than configurations in which the components are not axially aligned with the optical fiber. Furthermore, when the piezoelectric and electroluminescent components are identical as described in the previous embodiment of FIG. 7, the multilayer assembly is reduced to only two layers.

Figure 18:
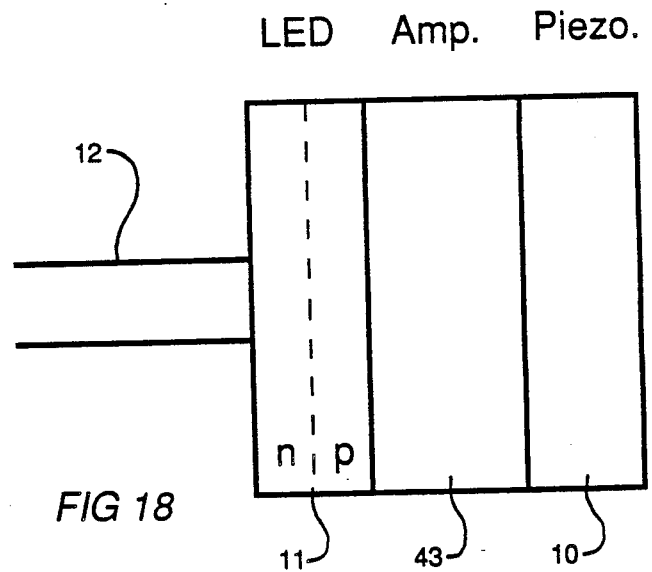
FIG. 18 is a schematic of a design which includes a transistor preamplifier to improve the sensor responsivity by amplifying the piezoelectrically driven current which is conducted through the electroluminescent component.
Figure 19:
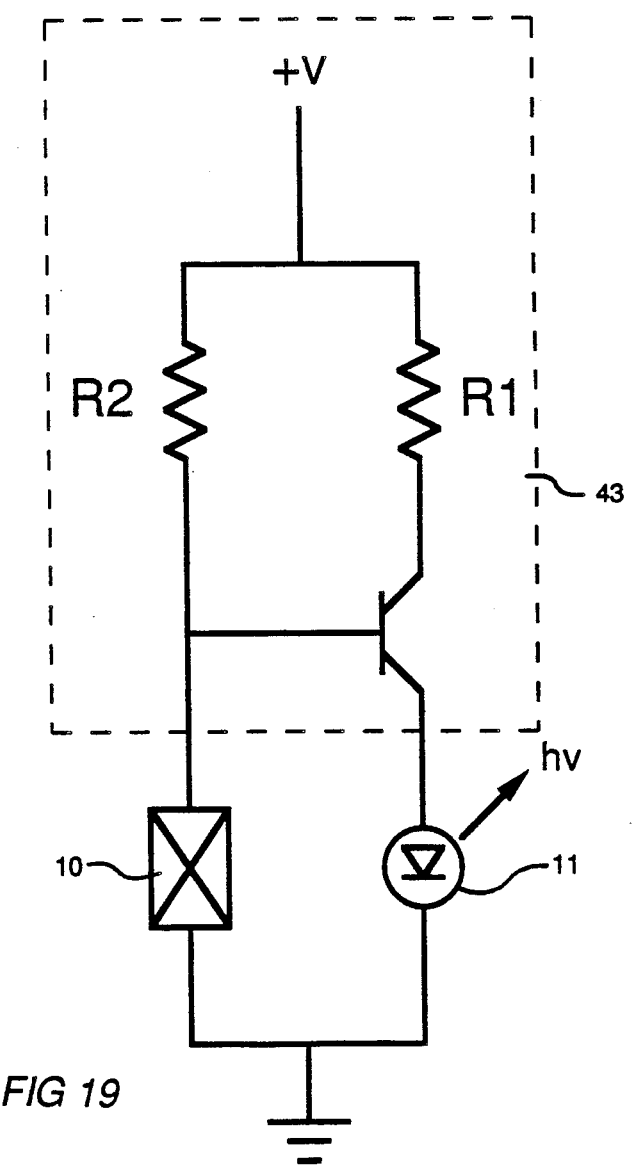
FIG. 19 is an electrical schematic for the embodiment shown in FIG. 18.

Another embodiment of the present invention includes a component in the transducer to amplify the piezoelectric response. FIG. 18 shows one possible configuration of this embodiment. The amplifier (43) is used to drive the electroluminescent component. The gain provided by the amplifier improves the sensitivity and responsivity of the transducer. The amplifier includes a bias voltage source which may consist of a battery or a photovoltaic source as described in previous embodiments. FIG. 19 provides an electrical schematic for this embodiment.

I claim:

1. A dynamic mechanical stress transducer comprising a piezoelectric material and an electroluminescent material in electrical communication with the piezoelectric material, an optical fiber waveguide in optical communication with the electroluminescent material whereby the electrical response of the piezoelectric material to mechanical stress induces an electric current through the electroluminescent material causing the electroluminescent material to emit light at an intensity in proportion to the magnitude and rate of change of applied stress, said light guided through the optical fiber.

2. The stress transducer according to claim 1 wherein the piezoelectric material is selected from the group consisting of quartz, polyvinylidene diflouride, lead zirconium titanate and barium titanate.

3. The stress transducer according to claim 1 wherein the electroluminescent material is selected from the group consisting of light emitting diode semiconductor materials known as group III–V compounds.

4. The stress transducer according to claim 1 including a focusing element inserted between the electroluminescent material and the optical fiber waveguide to match the field of view of the electroluminescent material to the optical fiber wave guide.

5. The stress transducer according to claim 1 including an electrically conducting electrode in intimate electrical contact with the piezoelectric material to one side of the electrode and in intimate electrical contact with the electroluminescent material to the other side of the electrode.

6. The stress transducer according to claim 1 including means in optical communication with and remotely located on the optical fiber waveguide to sense said light guided through the waveguide.

7. The stress transducer according to claim 1 wherein the optical fiber waveguide is secured to the electroluminescent material and the electroluminescent material is secured to the piezoelectric material.

8. A dynamic mechanical stress transducer comprising a material capable of emitting light in response to applied stress and an optical fiber waveguide secured to the light emitting material in position to communicate emitted light therefrom through the waveguide.

9. The stress transducer according to claim 8 wherein said light emitting material possesses both piezoelectric and electroluminescent properties.

10. The stress transducer according to claim 8 wherein said light emitting material is gallium arsenide.

11. The stress transducer according to claim 8 including a focusing element inserted between the light emitting material and the optical fiber waveguide.

12. The stress transducer according to claim 8 including means in optical communication with and remotely located on the optical fiber waveguide to sense said light guided through the waveguide.

13. A dynamic mechanical stress transducer comprising an electroluminescent material and an optical fiber waveguide secured in optical communication to the electroluminescent material,
   a voltage source in electrical contact with the electroluminescent material to establish a bias voltage across the electroluminescent material, and
   a piezoelectric material in electrical contact with the electroluminescent material,
   whereby in response to stress applied to the piezoelectric material the intensity of light emitted by the electroluminescent material is changed and transported through the waveguide.

14. The stress transducer according to claim 13 wherein the voltage source comprises a battery inserted between the piezoelectric material and the electroluminescent material,
   a first electrically conducting electrode in intimate contact with the piezoelectric material and one side of the battery and,
   a second electrically conducting electrode in intimate contact with the electroluminescent material and the other side of the battery.

15. The stress transducer according to claim 14 wherein at least one of said electrodes provides mechanical attachment between the battery and the material in intimate contact with the electrode.

16. The stress transducer according to claim 13 including a photoconductive material electrically connected in series between the voltage source and the electroluminescent material and means to provide a source of light to the photoconductive material.

17. The stress transducer according to claim 16 wherein the means to provide light to the photoconductive material comprise an optical fiber waveguide in optical communication with the photoconductive material.

18. The stress transducer according to claim 16 wherein the means to provide light to the photoconductive material include means to vary the light intensity from the light source and thereby impose a variable bias voltage across the electroluminescent material.

19. The stress transducer according to claim 18 wherein the means to vary the light intensity from the light source modulate at a known frequency the bias voltage and the light intensity from the electroluminescent material, and including light detection means in optical communication with the optical fiber waveguide, said light detection means sensitive to stress induced changes in the modulated optical light signal from the electroluminescent material.

20. The stress transducer according to claim 13 wherein the voltage source comprises a photovoltaic material electrically connected to the electroluminescent material and means to provide a source of light to the photovoltaic material.

21. The stress transducer according to claim 20 wherein the means to provide light to the photovoltaic material comprise an optical fiber waveguide in optical communication with the photovoltaic material.

22. The stress transducer according to claim 20 wherein the means to provide light to the photovoltaic material include means to vary the light intensity from the light source and thereby impose a variable bias voltage across the electroluminescent material.

23. The stress transducer according to claim 22 wherein the means to vary the light intensity from the light source modulate at a known frequency the bias voltage and the light intensity from the electroluminescent material, and including light detection means in optical communication with the optical fiber waveguide, said light detection means sensitive to stress induced changes in the modulated optical light signal from the electroluminescent material.

24. The stress transducer according to claim 13 wherein the voltage source includes amplifier means to increase the electrical signal transmitted from the piezoelectric material to the electroluminescent material.

25. The stress transducer according to claim 16 wherein the light absorption band of the photoconductive material substantially overlaps the light emitting band of the electroluminescent material.

26. The stress transducer according to claim 16 wherein the light absorption band of the photoconductive material is substantially transmissive to the light emitting band of the electroluminescent material.

27. The stress transducer according to claim 20 wherein the light absorption band of the photovoltaic material substantially overlaps the light emitting band of the electroluminescent material.

28. The stress transducer according to claim 20 wherein the light absorption band of the photovoltaic material is substantially transmissive to the light emitting band of the electroluminescent material.

29. The stress transducer according to claim 20 wherein the photovoltaic material and the electroluminescent material comprise adjacent layers, said photovoltaic material substantially transmissive of the light emitting band of the electroluminescent material.

30. The stress transducer according to claim 20 wherein the photovoltaic material and piezoelectric material are stacked in adjacent layers to either side of an electroluminescent material layer, said photovoltaic material substantially transmissive of the light emitting band of the electroluminescent material.

31. The stress transducer according to claim 8 including a voltage source in electrical communication with the light emitting material to establish a bias voltage across the material.

* * * * *